United States Patent

[11] 3,583,793

[72] Inventor Herrera C. Crisogono
Cumin a Santa Domingo, Fraccionamiento El Nogalar, San Nicolas de Los Garza, Nuevo Leon, Mexico

[21] Appl. No. 813,414
[22] Filed Apr. 4, 1969
[45] Patented June 8, 1971

[54] SUN BEACON
6 Claims, 8 Drawing Figs.

[52] U.S. Cl. .......... 350/299, 350/289, 350/99
[51] Int. Cl. .......... G02b 5/08
[50] Field of Search .......... 350/6, 7, 99, 288, 293, 299—305, 289, 292; 126/270; 60/26; 353/3; 352/84; 240/41.2, 41.36, 44.1, 61.05, 126 b, 138, 139, 240

[56] References Cited
UNITED STATES PATENTS

| | | | |
|---|---|---|---|
| 761,317 | 5/1904 | McCall | 74/86 |
| 1,989,095 | 1/1935 | Howard | 240/61.05 |
| 3,374,763 | 3/1968 | Browning | 350/99 |

*Primary Examiner*—David Schonberg
*Assistant Examiner*—Michael J. Tokar
*Attorney*—Kimmel, Crowell & Weaver

ABSTRACT: A sun beacon including a plurality of mirrors arranged at an angle to the horizon and to each other and mounted in a framework to revolve through 360° with the angle of each of the mirrors being changed with respect to the horizon on each revolution. The mirrors reflect sunlight so that an observer's eyes will be flicked by a sun reflection in at least one out of a group of revolutions during a relatively short period of time.

16 17 14 15 18 21 38 39 40 38 13 12 39 39 27 27 26 20 23 26 11 19 22 10

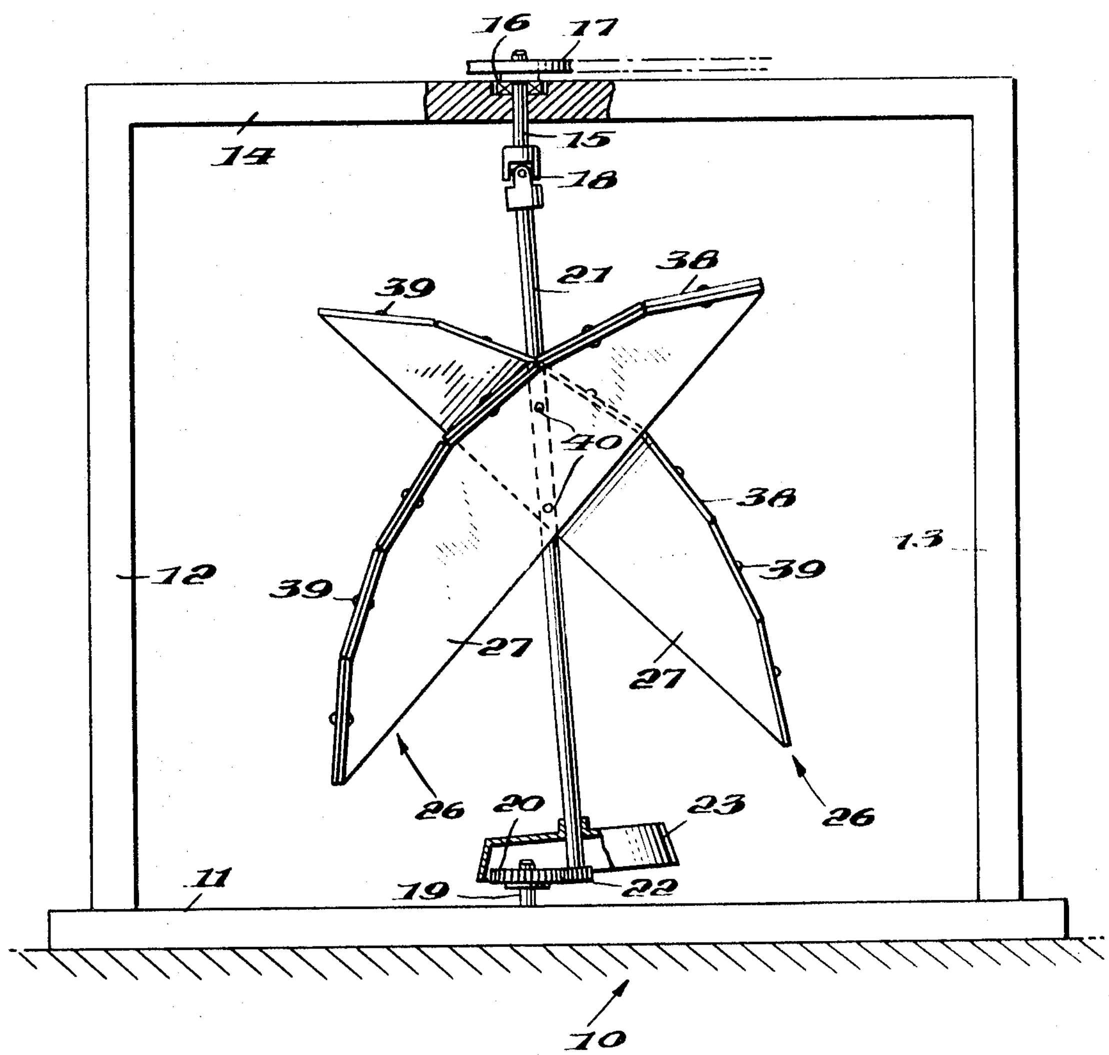
INVENTOR
CRISOGONO HERRERA C.
BY Kimmel, Crowell & Weaver
ATTORNEYS

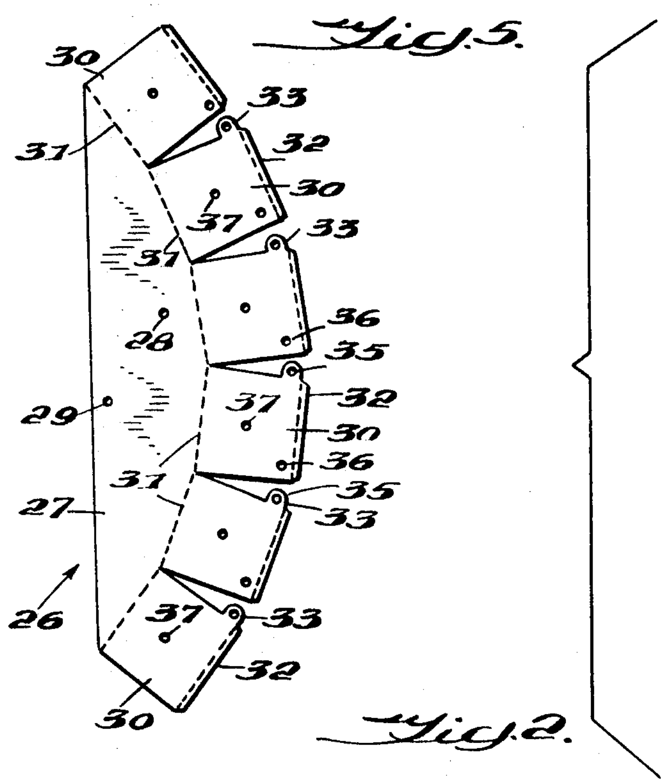
Fig.5.
30
33
31
32
30
37
33
31
36
28
35
37
32
29
30
36
31
35
27
33
26
37
33
32
30
Fig.2.
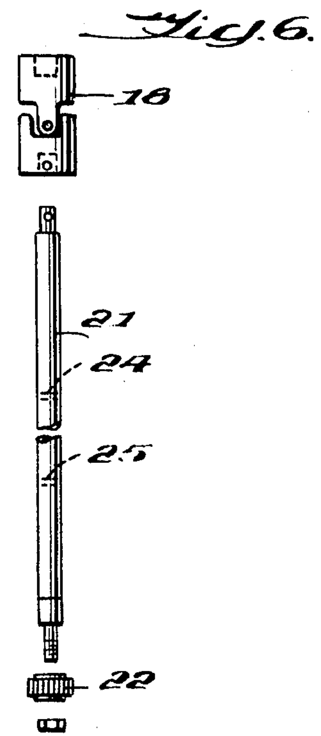
Fig.6.
18
21
24
25
22
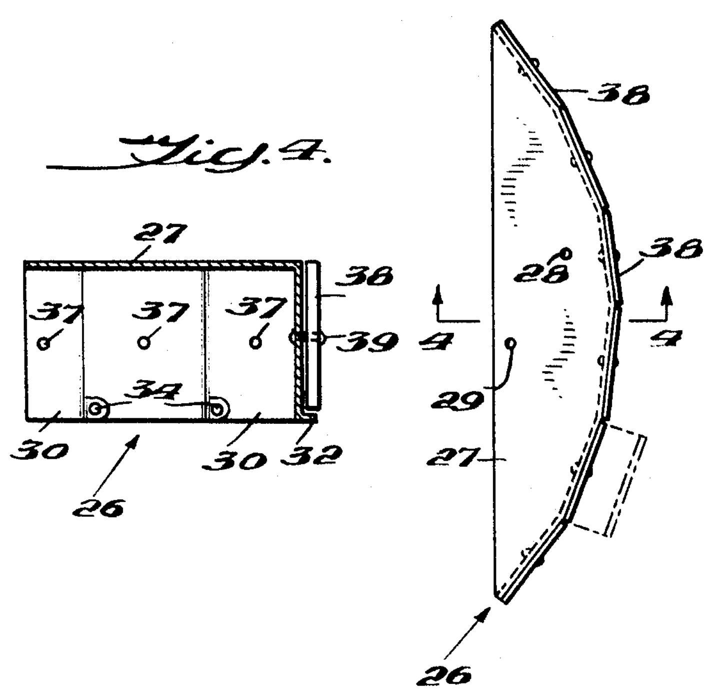
Fig.4.
27
38
37
37
37
39
34
30
30
32
26
38
28
38
4
4
29
27
26
Fig.3.
39
38
22
39
38

21
23
20
22
19
11

17
14
16
15

18
21

SUN BEACON

BACKGROUND OF THE INVENTION

1. Field of the Invention

The present invention relates to sun beacons of the reflective type and consists of a rotating plurality of reflectors which are arranged to have their angle to the horizon constantly changed during rotation so that all points on the horizon are covered by a reflection during a group of revolutions of the sun beacon.

2. Description of the Prior Art

Revolving sun beacons of the prior art have utilized a fixed angle with respect to the horizon and as a consequence, the beacon failed to reach many points of the horizon during its revolutions.

SUMMARY OF THE INVENTION

The present invention consists of a holder for a plurality of mirrors arranged angularly with respect to each other and to the horizon with the mirrors being arranged to rotate on a wabbling shaft so that the angle of each of the mirrors with respect to the horizon changes with each revolution of the reflectors and in a relatively few number of revolutions all points of the horizon are covered with a reflection.

BRIEF DESCRIPTION OF THE DRAWINGS

One embodiment of the invention is illustrated in the attached drawings in which:

FIG. 1 is a side elevation of the invention shown partially in section for convenience of illustration;

FIG. 2 is a side elevation of one of the reflector assemblies;

FIG. 3 is a front elevation of the reflector assembly of FIG. 2;

FIG. 4 is an enlarged fragmentary transverse cross section taken along line 4—4 of FIG. 2 looking in the direction of the arrows;

FIG. 5 is a plan view of the blank from which the reflector assembly is assembled;

FIG. 6 is an exploded side elevation of the wabble shaft and its mountings;

DESCRIPTION OF THE PREFERRED EMBODIMENT

Figure 7:
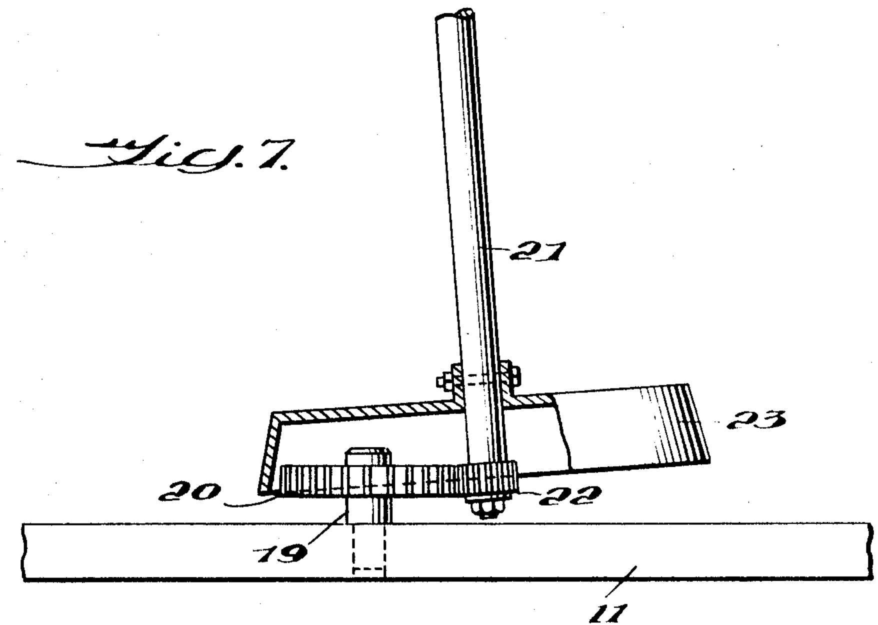
FIG. 7 is an enlarged fragmentary detail elevation of the mounting of the lower end of the wabble shaft.
Figure 8:
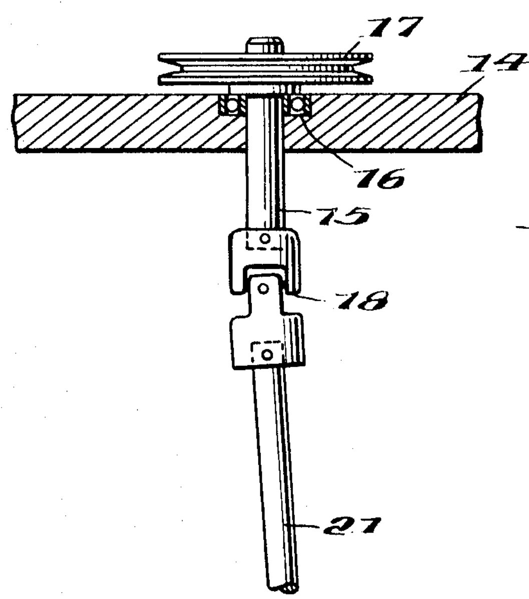
FIG. 8 is an enlarged fragmentary detail elevation of the mounting of the upper end of the wabble shaft.

Referring now to the drawings in detail wherein like reference characters indicate like parts throughout the several figures, the reference numeral 10 indicates generally a sun beacon constructed in accordance with the invention.

The sun beacon 10 includes a foundation 11, a pair of oppositely disposed uprights 12,13 having their lower ends fixed to the foundation 11. A crossmember 14 extends horizontally and has its opposite ends fixed to the upper end of the uprights 12,13.

A stub shaft 15 is journaled in the crossmember 14 on a roller bearing 16 intermediate the uprights 12,13. A pulley 17 is fixedly secured to the upper end of the stub shaft 15 for connection to a drive motor by means of a belt, neither one of which is shown. A universal joint 18 has one end connected to the lower end of the stub shaft 15 for reasons to be assigned.

A stub shaft 19 is fixedly secured to the foundation 11 intermediate the uprights 12,13 and in axial alignment with the stub shaft 15. A spur gear 20 is fixedly secured to the stub shaft 19 and is spaced above the foundation 11. An elongate shaft 21 has its upper end secured to the universal joint 18 and carries a spur gear 22 fixedly secured to the lower end thereof. The spur gear 22 is meshed with the gear 20 for reasons to be assigned. The number of teeth of the gears 20,22 are such as to establish a fractional ratio therebetween and not an integer number, with the objective that at each turn of the shaft 21, different teeth will be meshing so that the rotating structure will take a number of different positions before the same teeth of the gears mesh again.

A dished shape retainer 23 is secured to the shaft 21 and is arranged to overlie the gears 20,22 protecting them from the elements and maintaining the gear 22 in contact with the gear 20.

The shaft 21 has a pair of transverse bores 24,25 as can be seen in FIG. 6.

The reflector unit generally indicated at 26 consists of a flat metal plate 27 having a pair of bores 28,29 formed therein and arranged to coincide with the bores 24,25 of the shaft 21. A plurality of generally rectangular mirror supporting plates 30 are formed along a series of short edges 31 of the plate 27. The rectangular plates 30 each is provided with a flange 32 along the edge thereof opposite the plate 27 to be bent at right angles to the plates 30 as can be seen in FIG. 4. An ear 33 is formed on the outer portion of one side edge of each of the plates 30 to overlap the adjacent plate 30 and to be secured thereto by means of a rivet 34 extending through a bore 35 in the ear 33 and a bore 36 in the adjacent rectangular plate 30.

A bore 37 is formed centrally of each of the rectangular plates 30 for reasons to be assigned. Each of the generally rectangular plates 30 is bent perpendicularly to the plate 27 along the edge 31 so that their adjacent side edges are in contact with each other and the rivets 34 are inserted through the bores 35,36 to secure the plates 30 in erected position. The flanges 32 are bent outwardly of the plate 27 perpendicularly to the rectangular plates 30 as can be seen in FIG. 4 and a generally rectangular mirror 38 is secured to each of the rectangular plates 30 by means of a rivet 39 extending through the mirror 38 and the bore 37 with the flange 32 engaging one edge of the mirror 38 to secure it against rotation about the rivet 39.

A pair of reflector units 26 are arranged on opposite sides of the shaft 21 and a pair of bolts 40 pass through the bores 28,29 and the bores 24,25 to mount the reflector units 26 to the shaft 21.

In the use and operation of the invention, the sun beacon 10 is placed upon a high vantage point in a position unobstructed by trees, buildings, or the like.

The cup shape of the reflector units 26 and their opposite disposition on the shaft 21 produces a propellerlike configuration which is rotated by any wind coming in contact therewith. In areas having more or less constant winds, this would be the preferred method of operation.

When wind is not available, the beacon is adapted to be operated by a power source in which a conventional motor is connected by a belt to the pulley 17 and the wabble shaft 21 is caused to rotate on its own axis.

Rotation of the wabble shaft 21 when the device is wind or power driven rotates the spur gear 22 causing the lower end of the wabble shaft 21 to revolve around the spur gear 20 in an orbital manner. Sun striking the mirrors 38 is reflected in many different directions due to the different angles of the mirrors 38. As the mirrors 38 revolve around the wabble shaft 21, the orbital path of the wabble shaft 21 causes the angle of the mirrors with respect to the horizon to be constantly changed so that upon a group of revolutions being completed, all points in the horizon will have been touched with a reflection of the sun. Obviously, the brilliance of the sunshine striking the eyes of the viewer will attract his attention even when the most brilliant of lights would be difficult to see in the daytime.

Having thus described the preferred embodiment of the invention, it should be understood that numerous structural modifications and adaptations may be employed without departing from the spirit of the invention.

I claim:

1. A sun beacon comprising:

a plurality of flat plates;

each of said flat plates having a plurality of light reflector supporting plates formed thereon and projecting laterally from a side and edge thereof and at right angles with respect thereto;

each of said light reflector supporting plates being angularly disposed relative to an adjacent one thereof;
light reflector means secured on each of said light reflector supporting plates;
a shaft and means for securing said flat plates on diametrically opposed sides of said shaft; and
means for orbiting one end of said shaft upon rotation of said shaft on its own axis.

2. A sun beacon as defined in claim 1 wherein:
said light reflector means comprises a mirror for each light reflector supporting plate.

3. A sun beacon as defined in claim 2 wherein:
each light reflector support plate and its associated mirror is generally rectangular in configuration.

4. A sun beacon as defined in claim 3, wherein:
said flat plates are in juxtaposition relative to one another and with their respective mirrors having ends projecting away therefrom.

5. A sun beacon as defined in claim 4 wherein:
said flat plates have one of their respective ends extending transversely relative to one another.

6. A sun beacon as defined in claim 5 and:
means connecting said mirror supporting plates in their respective angular relationship relative to one another.